United States Patent
Katsumata et al.

(10) Patent No.: US 11,950,614 B2
(45) Date of Patent: Apr. 9, 2024

(54) FOOD MATERIAL POWDER SUPPLY DEVICE

(71) Applicant: SODICK CO., LTD., Kanagawa (JP)

(72) Inventors: Kenta Katsumata, Kanagawa (JP); Takeshi Okiyama, Kanagawa (JP); Yasuhisa Ogata, Kanagawa (JP)

(73) Assignee: SODICK CO., LTD., Kanagawa (JP)

(*) Notice: Subject to any disclaimer, the term of this patent is extended or adjusted under 35 U.S.C. 154(b) by 794 days.

(21) Appl. No.: 17/082,041

(22) Filed: Oct. 28, 2020

(65) Prior Publication Data

US 2021/0127717 A1 May 6, 2021

(30) Foreign Application Priority Data

Oct. 30, 2019 (JP) .................................. 2019-196847

(51) Int. Cl.
B01F 27/091 (2022.01)
A23L 3/00 (2006.01)
(Continued)

(52) U.S. Cl.
CPC .............. *A23L 3/361* (2013.01); *A23L 3/001* (2013.01); *A23L 3/003* (2013.01); *A23L 3/0155* (2013.01);
(Continued)

(58) Field of Classification Search
CPC .... B01F 27/091; B01F 27/112; B01F 27/114; B01F 27/1145; B01F 33/70; B01F 35/514;
(Continued)

(56) References Cited

U.S. PATENT DOCUMENTS 3,969,314 A * 7/1976 Grigull ..................... B29B 7/60
524/451
4,038,186 A * 7/1977 Potter .................... B01D 12/00
210/207
(Continued)

FOREIGN PATENT DOCUMENTS

EP    1114672 A2 * 7/2001 .......... B01F 7/00391
JP    H09103693    4/1997
(Continued)

OTHER PUBLICATIONS

"Office Action of Japan Counterpart Application", dated May 7, 2020, with English translation thereof, pp. 1-9.
(Continued)

*Primary Examiner* — Reginald Alexander
(74) *Attorney, Agent, or Firm* — JCIPRNET (57) ABSTRACT

A food material powder supply device 1 of the disclosure includes a supply tank 50 that temporarily stores food material powder in a tank 50A and supplies the food material powder to a processing container 2A of a food processing machine 2, a vacuum device 70 that reduces the pressure inside the supply tank 50 with vacuum pumps 71A and 71B, and a control device 3 that operates the vacuum device 70 to reduce the internal pressure of the supply tank 50 to be equal to or lower than a predetermined atmospheric pressure at which moisture of the food material powder is evaporated and cools the food material powder in the supply tank 50. A stirring member 54 which is driven to rotate during the cooling of the food material powder is arranged inside the tank 50A.

13 Claims, 9 Drawing Sheets

(51) Int. Cl.
  *A23L 3/015* (2006.01)
  *A23L 3/36* (2006.01)
  *B01F 27/112* (2022.01)
  *B01F 27/1145* (2022.01)
  *B01F 33/70* (2022.01)
  *B01F 35/90* (2022.01)

(52) U.S. Cl.
  CPC .......... *B01F 27/091* (2022.01); *B01F 27/112* (2022.01); *B01F 27/1145* (2022.01); *B01F 33/70* (2022.01); *B01F 2035/99* (2022.01)

(58) Field of Classification Search
  CPC ....... B02C 11/08; A21C 1/142; A21C 1/1425; A21C 1/146
  USPC ..... 366/139, 143, 309, 319; 222/156, 146.6; 99/477
  See application file for complete search history.

(56) References Cited

U.S. PATENT DOCUMENTS

| | | | | |
|---|---|---|---|---|
| 4,125,208 A | * | 11/1978 | Bettermann | B29C 48/288 366/186 |
| 4,361,405 A | * | 11/1982 | Wedek | B22C 5/04 366/139 |
| 6,040,013 A | * | 3/2000 | Karales | A23B 4/26 366/139 |
| 6,536,937 B1 | * | 3/2003 | Burchett | B01F 33/5014 366/139 |
| 2008/0245265 A1 | * | 10/2008 | Corbelli | B01F 23/53 516/111 |
| 2020/0170261 A1 | | 6/2020 | Ueno et al. | |

FOREIGN PATENT DOCUMENTS

| | | |
|---|---|---|
| JP | 2000140538 | 5/2000 |
| JP | 2005143357 | 6/2005 |
| JP | 3941903 | 7/2007 |
| JP | 2010058088 | 3/2010 |
| JP | 2012176349 | 9/2012 |
| JP | 2014070886 | 4/2014 |
| JP | 2016136084 | 7/2016 |
| JP | 6541863 | 7/2019 |

OTHER PUBLICATIONS

"Office Action of Japan Counterpart Application", dated Sep. 10, 2020, with English translation thereof, pp. 1-10.
Katsumata et al., "The food material powder supply device," the 2019 International Food Machinery & Technology Exhibition, Exhibition date: Jul. 9, 2019-Jul. 12, 2019, Exhibition site: Tokyo Big Sight (3-11-1, Ariake, Koto-ku, Tokyo), submit with "Proving Document for seeking Application of Provision of Exceptions to Lack of Novelty of Invention", with English translation thereof, Grace Period Disclosure.

* cited by examiner

FOOD MATERIAL POWDER SUPPLY DEVICE

CROSS-REFERENCE TO RELATED APPLICATIONS

This application claims the priority benefit of Japan Patent Application No. 2019-196847, filed on Oct. 30, 2019. The entirety of the above-mentioned patent application is hereby incorporated by reference herein and made a part of this specification.

BACKGROUND

Technical Field

The disclosure relates to a food material powder supply device. In particular, the disclosure relates to a food material powder supply device including at least a cooling mechanism that cools material powder.

Related Art

A plant-type food material supply device has been known which supplies the material to a food processing machine such as a mixing machine, a kneader, a stirrer, or a crusher, and has a configuration of storing particulate food material powder such as wheat flour, cornstarch, rice flour and buckwheat flour or granular food material powder such as rice grain and soybean in a storage tank, taking the material out from the storage tank, weighing the material, and then conveying a predetermined amount of the material to a supply tank.

Specifically, for example, a food material powder supply device applied to a mixer of a noodle making machine that produces udon noodle dough is configured in a manner of wheat flour called udon flour is stored in a silo corresponding to the storage tank, a predetermined amount of the wheat flour which is determined in advance is transported to the supply tank referred to as a holding bin, a hopper, or a receiver tank in one mixing operation, and the wheat flour is put into a chamber of the mixer.

In the plant-type food material supply device, the temperature of the material changes under the influence of the outside air temperature during a storage period in which the material is stored in the storage tank. Therefore, the temperature of the material before processing such as stirring, mixing, kneading, or crushing may be too high in summer and too low in winter compared with a predetermined temperature desired in the processing. If the processing cannot be performed in a state that the temperature of the material is within a predetermined temperature range, the quality of products is adversely affected. Therefore, it is required to cool or heat the material to a predetermined temperature before processing.

Conventionally, as a method for cooling the material, a method for directly applying cold air to the material in the supply tank to cool the material, a method for lowing the room temperature of a manufacturing site by an air conditioning facility such as a cooler to suppress the temperature rise of the material, a method for adjusting the temperature of the material by cooling the material with a jacket or the like from the outer wall of the mixing machine such as a mixer, a method for lowering the temperature of water used for the material, and the like have been used.

Patent literature 1 is a disclosure related to a mixer for noodle dough, in which a blower fan 13 and a cooler 14 are arranged in an air pipe 10 connected to a mixer drum 2, and the air inside the air pipe 10 cooled by the cooler 14 is sent to the mixer drum 2 to cool the material in the mixer drum 2 (paragraph 0012, paragraph 0014, FIG. 1).

In addition, patent literature 2 is a disclosure related to a powder particle continuous stirring sterilization device, in which a cooling jacket 411 is arranged on the outer periphery of a cylindrical pressure-resistant container 5 of a cooling device 4, and a cooling medium such as water, a heat medium or the like is supplied to the inside of the cooling jacket 411 to cool the material in the cylindrical pressure-resistant container 5 (paragraph 0042, FIG. 1).

However, since the food material powder which is fine and represents the wheat flour has a small thermal conductivity and a particulate form, there is a feature that it is difficult to transfer heat between the powders and it is difficult to uniformly apply the cold air to all the material powders, and there has been problems that by a conventional method for applying the cold air to cool the material (patent literature 1) or a conventional method for cooling the outer wall of the supply tank (patent literature 2), it is impossible to cool the powder in a short time or to cool the powder uniformly.

In view of the above problems, the inventors have already invented and disclosed a food material powder supply device in which a vacuum pump is connected to a supply tank, the pressure inside the supply tank is lowered to be equal to or lower than a pressure at which moisture is evaporated, thereby a part of the moisture retained by the powder is forcibly evaporated, and the material powder is cooled utilizing the latent heat at that time (patent literature 3). By using the food material powder supply device of the disclosure, the material powder in the supply tank can be uniformly cooled in a short time.

Patent literature 1: Japanese Patent Laid-open No. 2005-143357
Patent literature 2: Japanese Patent No. 3941903
Patent literature 3: Japanese Patent No. 6541863

The inventors have conducted further experiments on the food material powder supply device, and have encountered the following three problems (1), (2), and (3).

(1) Compaction of Material Powder

In the supply tank in which the material powder is stored, the material powder in the lower layer is compressed by the weight of the material powder in the upper layer, the space between the powders is reduced, and the lower layer becomes dense. When the lower layer becomes dense, there is a problem that moisture evaporation of the material powder in the lower layer is hindered by the upper layer, the temperature of the material powder in the lower layer does not drop appropriately, a temperature difference is generated between the upper and lower layers, and the uniform cooling of all of the material powders cannot be realized.

In addition, when atmosphere release is performed from the upper part of the supply tank after the supply tank is set in the depressurization state, air suddenly enters the inside of the supply tank from an atmosphere release port, the material powder is compressed due to the air that has entered, and the compaction of the material powder in the lower layer is further accelerated.

(2) Remaining of Steam in Housing

When the pressure inside the supply tank is reduced by a vacuum pump, the moisture retained by the material powder evaporates, and the steam stays inside the supply tank. If the steam continues to stay in the supply tank, the increase in the vacuum degree inside the supply tank slows down, which becomes a factor that hinders the temperature reduction of the material powder.

(3) Increase in Running Cost

Since when the material powder in the supply tank is cooled to a desired temperature, it is usually necessary to continue operation of the vacuum pump, a problem that the running cost increases is caused. In addition, if the operating time of the vacuum pump becomes longer, the life of the vacuum pump becomes shorter, and there is also a concern about an increase in the maintenance cost, such as an increase in the number of times of exchange of the vacuum pump or the number of times of maintenance.

Therefore, an objective of the disclosure is to provide a food material powder supply device capable of preventing compaction of material powder and retention of steam in a supply tank, and cooling all of the material powder uniformly and quickly. Furthermore, an objective of the disclosure is to provide a food material powder supply device capable of cooling material powder appropriately with minimum power consumption.

SUMMARY

A food material powder supply device of the disclosure includes a supply tank that temporarily stores food material powder in a tank and supplies the food material powder to a processing container of a food processing machine, a vacuum device that reduces the pressure inside the supply tank with vacuum pumps, and a control device that operates the vacuum device to reduce the internal pressure of the supply tank to be equal to or lower than an atmospheric pressure at which moisture of the food material powder is evaporated, and cools the food material powder in the supply tank. A stirring member which is driven to rotate during the cooling of the food material powder is arranged inside the tank.

In the embodiment, the "food material powder supply device" in the specification is a wheat flour supply system, the "processing container of food processing machine" in the specification is a chamber of a mixer, and the "supply tank" in the specification is a holding bin.

According to the disclosure, since the stirring member is arranged inside the tank which constitutes the supply tank, when the food material powder is cooled utilizing a latent heat of vaporization, it is possible to perform the cooling while exchanging the material powder of the upper layer and the lower layer. By performing the cooling while exchanging the upper layer and the lower layer, it is possible to prevent the problem that the lower layer is compacted because of the weight of the material powder in the upper layer and the evaporation of the moisture in the lower layer is hindered, and it becomes possible to uniformly cool all of the material powder.

In the food material powder supply device of the disclosure, the stirring member has a stirring blade, and the stirring blade is formed into a shape of being spirally wound along the inner wall of the tank.

According to the disclosure, since the stirring blade is formed into a spiral shape along the inner wall of the tank, when the stirring blade rotates, it becomes possible to carry the material powder in the lower layer from the bottom to the top while stirring the material powder and to carry the material powder in the upper layer from the top to the bottom.

In the food material powder supply device of the disclosure, the stirring blade includes a main blade and an auxiliary blade.

According to the disclosure, since the stirring blade having a spiral shape is configured by the main blade and the auxiliary blade, and the main blade and the auxiliary blade are arranged at point-symmetric positions centered on a main shaft, it becomes possible that the material powder in the lower layer which enters the gap of the main blade is lifted up to the upper layer and stirred by the auxiliary blade.

In the food material powder supply device of the disclosure, the vacuum device includes a filter connected to a gas discharge port of the supply tank, and a cold trap arranged close to the gas discharge port of the filter.

According to the disclosure, since the cold trap is arranged close to the discharge port of the filter, it becomes possible to quickly discharge the steam generated in the tank from the inside of the tank and capture the steam with the cold trap, and the temperature of the material powder can be lowered quickly.

In the food material powder supply device of the disclosure, the cold trap is cooled to a temperature lower than the temperature of the food material powder.

According to the disclosure, since the temperature of the cold trap is set to be lower than the temperature of the food material powder, the steam evaporated from the food material powder can be collected more quickly by the cold trap, and it becomes possible to rapidly reduce the amount of the steam in the supply tank and to more quickly lower the temperature of the material powder.

In the food material powder supply device of the disclosure, the vacuum device includes a drain tank that temporarily stores drainage collected by the cold trap.

According to the disclosure, since the drain tank which temporarily stores the drainage collected by the cold trap is arranged on the lower part of the cold trap, the drainage that is stored can be collectively discharged at one time.

In the food material powder supply device of the disclosure, the vacuum device includes a first vibrating member attached to the filter.

According to the disclosure, since the first vibrating member can vibrate to give vibration to the filter, the material powder deposited on the filter falls and is removed, the clogging of the filter can be prevented, and it becomes possible to quickly reduce the pressure inside the tank.

In the food material powder supply device of the disclosure, an atmosphere release port is arranged on the lower part of the tank.

According to the disclosure, since the atmosphere release port is arranged on the lower part of the tank, the material powder is pressed by the air which suddenly flows into the tank and pushed upward in the tank during the atmosphere release, and it becomes possible to prevent the material powder from being compacted.

In the food material powder supply device of the disclosure, a warming member is arranged in the tank.

According to the disclosure, since the warming member is arranged in the tank and the temperature of the inner wall of the tank is set to be higher than that of the material powder, dew condensation on the inner wall of the tank can be prevented, and the material powder can be prevented from adhering to the inner wall of the tank. Thus, all the material powder can be discharged from the discharge port without any waste, and it becomes possible to improve cleanability of the inside of the tank.

In the food material powder supply device of the disclosure, an inspection window and an illumination member are arranged on the upper part of the tank.

According to the disclosure, since the inspection window and the illumination member are arranged on the upper part of the tank, the state of the inside of the tank can be checked from the outside during the cooling of the material powder.

In the food material powder supply device of the disclosure, an inspection door is arranged on the center part of the tank.

Conventionally, the inside of the tank has been cleaned using opening parts arranged on the upper and lower surfaces of the tank, and thus the cleanability is very poor. According to the disclosure, since a plurality of inspection doors are arranged on the center part of the tank, it becomes possible for an operator to open and close the inspection door with a grip portion to easily and quickly clean the inside of the tank.

In the food material powder supply device of the disclosure, a second vibrating member is arranged on the center part of the tank.

According to the disclosure, since the second vibrating member is arranged on the center part of the tank and the second vibrating member vibrates to give vibration to the tank, it is possible to reliably drop the material powder adhering to the inner wall of the tank toward the discharge port, and all of the material powder can be discharged from the discharge port without any waste.

In the food material powder supply device of the disclosure, the control device performs control so as to measure the pressure inside the supply tank, and stop the vacuum pump when the pressure becomes equal to or lower than a reference value to maintain the depressurization state in the supply tank.

The "reference value" of the disclosure has the same meaning as an "internal pressure reference value" in the specification.

According to the disclosure, the pressure inside the supply tank is measured by a pressure sensor, the vacuum pump is driven until the pressure turns to be a preset reference value, and then the vacuum pump is stopped to maintain the internal pressure of the tank. Since the internal pressure of the tank is maintained even after the vacuum pump is stopped, it is possible to cool the material powder, and to reduce the power consumption without necessarily continue driving the vacuum pump.

DESCRIPTION OF THE EMBODIMENTS

Since the food material powder supply device of the disclosure is equipped with the stirring member, the cold trap, the atmosphere release port, and the like, it is possible to prevent the material powder in the lower layer from being compacted and to quickly collect the steam in the tank, the cooling time of the material powder can be shortened, and it becomes possible to cool all of the material powder uniformly.

In addition, the food material powder supply device of the disclosure is capable of reducing the power consumption by drive control of the vacuum pump.

Furthermore, since the food material powder supply device of the disclosure is equipped with the inspection door, the inspection window and the like, it is possible to provide a food material powder supply device which has improved visibility and cleanability.

Figure 1:
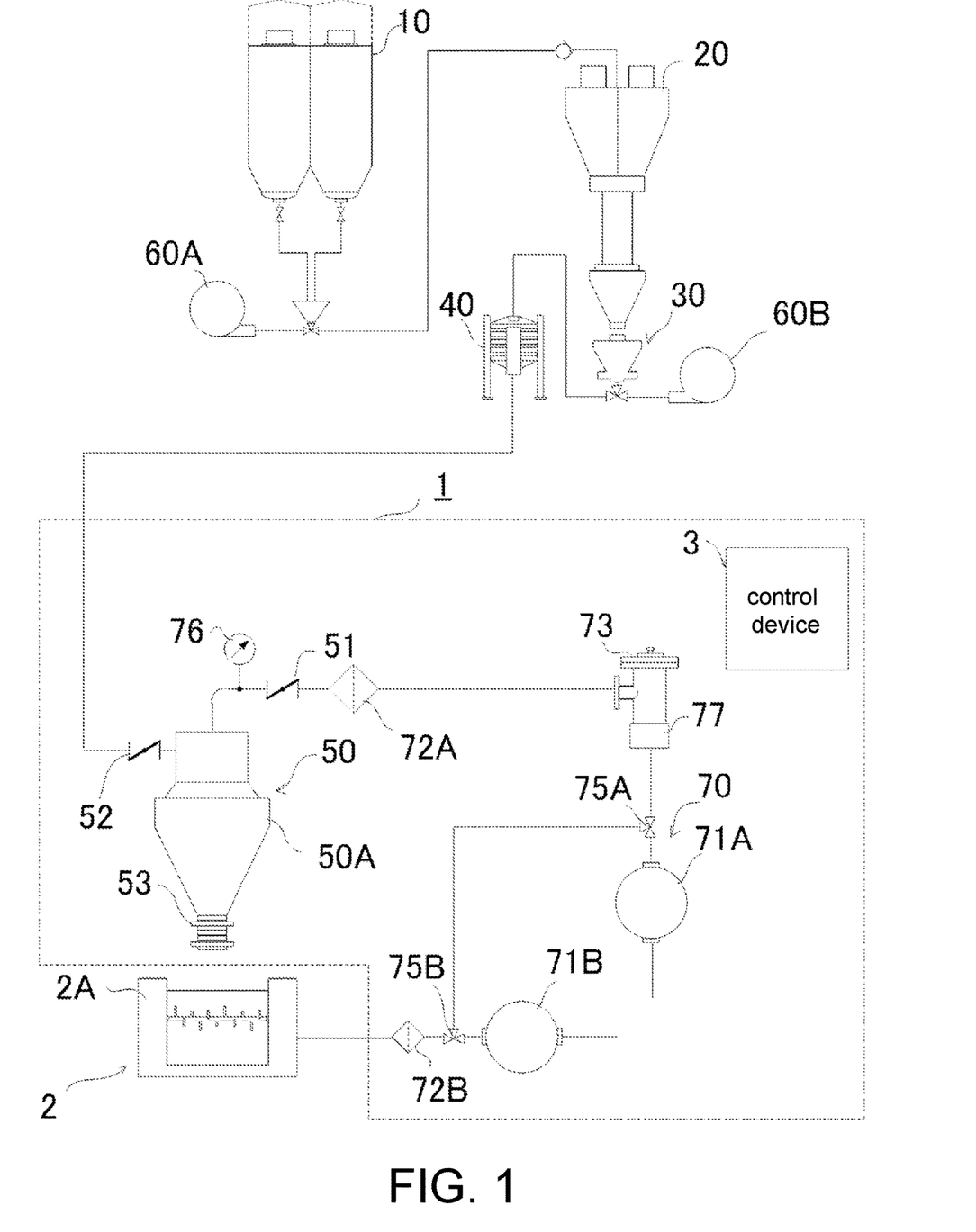
FIG. 1 is a block diagram showing an overview of a wheat flour supply system 1 which is an embodiment of the disclosure.

FIG. 1 is a block diagram showing an overview of a wheat flour supply system 1 which is an embodiment of the disclosure. In the embodiment, the wheat flour supply system 1 which is an embodiment of a food material powder supply device is described.

The food material powder supply device of the embodiment is the wheat flour supply system 1 of a plant-type which supplies wheat flour serving as food material powder to a food processing machine.

The wheat flour which is food material powder stored in a silo 10 is transported to a use bin 20 which is a storage tank by a blower 60A which is a pneumatic transfer device. A predetermined amount of the wheat flour transported to the use bin 20 is weighed by a scale 30 which is a weighing device, and is transported to an inline shifter 40 by a blower 60B. In the inline shifter 40, the wheat flour sent here is continuously sifted through a vibrating sieve to discharge foreign matter to the outside, and then the wheat flour is transported to the wheat flour supply system 1.

In the wheat flour supply system 1, the wheat flour transported here is temporarily cooled and stored, and thereafter, the wheat flour is discharged as necessary to a mixer 2 used in a noodle making machine, a confectionery making machine, a bread making machine or the like.

The mixer 2 is, for example, a device for kneading the wheat flour serving as a raw material of dough in the noodle making machine, the confectionery making machine, or the bread making machine, and the mixer 2 has at least a chamber 2A corresponding to a processing container of the food processing machine.

The wheat flour supply system 1 includes a holding bin 50 which is a supply tank, a control device 3 that performs an entire control of the wheat flour supply system 1, and a vacuum device 70 for cooling the wheat flour.

Figure 2:
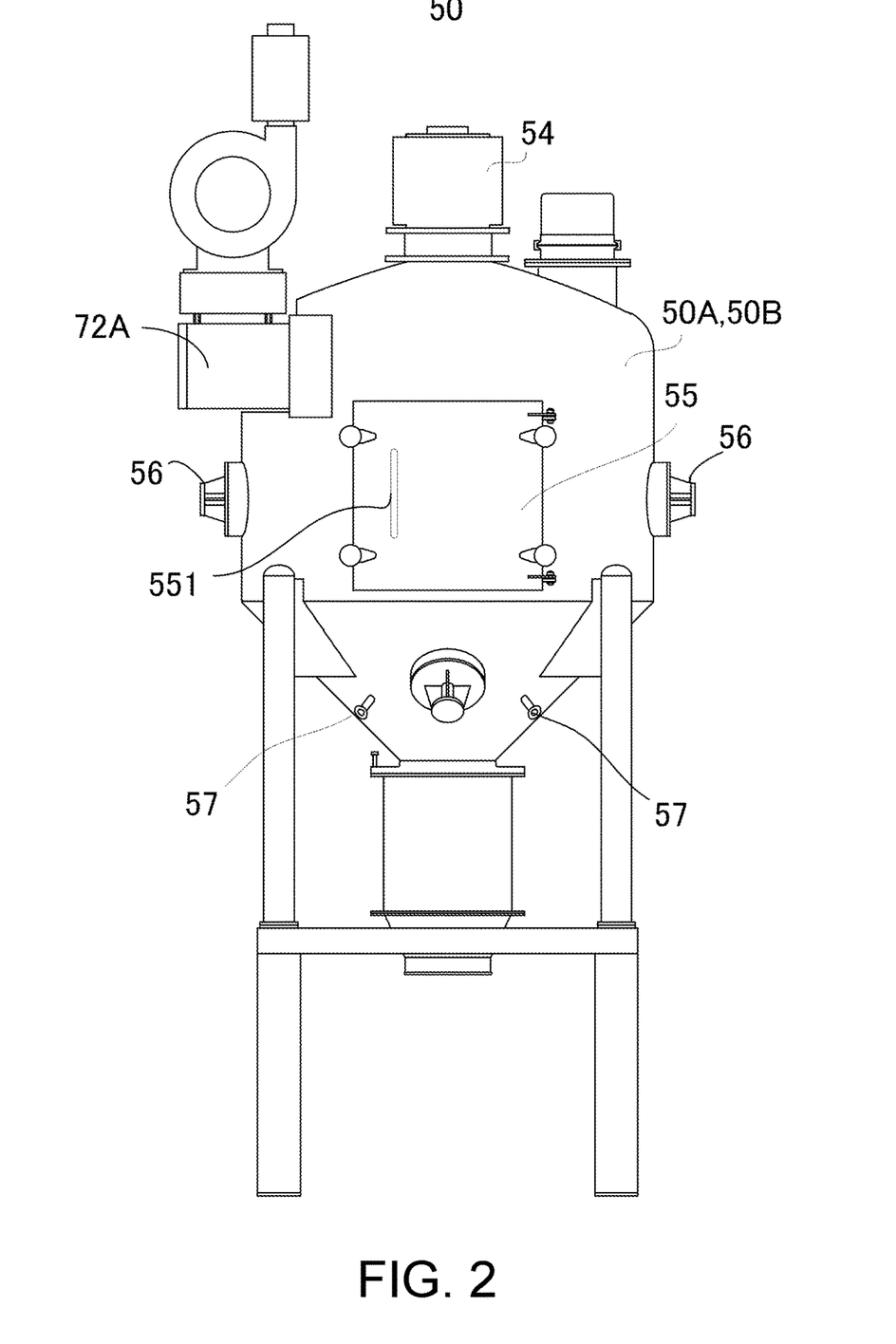
FIG. 2 is a front overview diagram showing a holding bin 50 of the embodiment.
Figure 3:
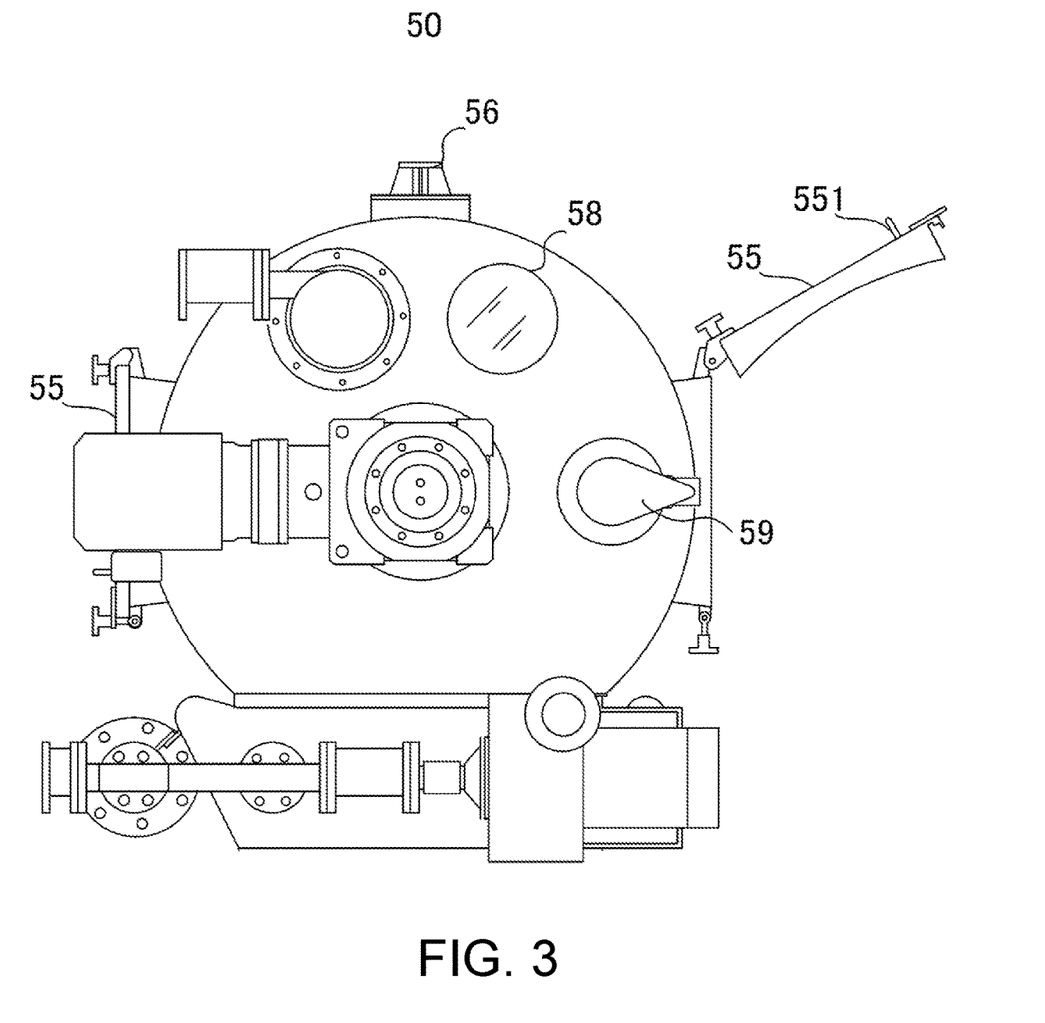
FIG. 3 is a plane schematic diagram showing the holding bin 50 of the embodiment.
Figure 4:
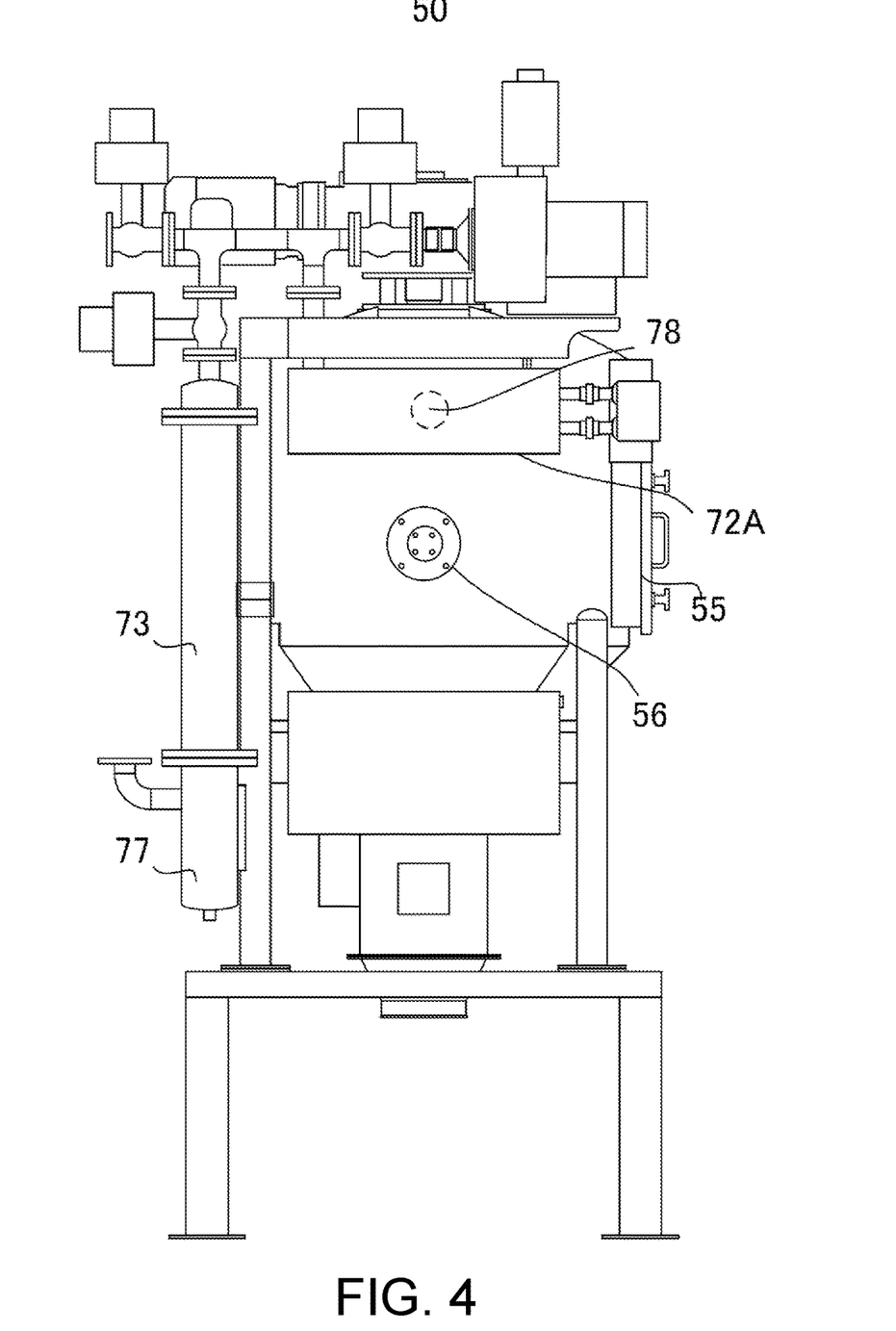
FIG. 4 is a left side schematic diagram showing the holding bin 50 of the embodiment.

FIG. 2 is a front overview diagram showing the holding bin 50 of the embodiment. FIG. 3 is a plane schematic diagram showing the holding bin 50 of the embodiment. FIG. 4 is a left side schematic diagram showing the holding bin 50 of the embodiment.

The holding bin 50 is a supply tank which temporarily stores, in the tank, the predetermined amount of wheat flour sent from the scale 30 through the inline shifter 40.

Regarding a tank 50A which is a vacuum container of the holding bin 50, the center part is cylindrical and the inner wall surface of the center part has a circular cross-section, and the lower part is formed into an inverse conical shape in which the diameter is reduced downward from the center and the entire inner side of the lower part is formed into a funnel shape. A discharge port for discharging the wheat flour that is stored to the mixer 2 is arranged on the lowest part of the holding bin 50.

In addition, a pressure sensor 76 for measuring the pressure inside the holding bin 50 is arranged on the upper part of the holding bin 50.

The tank 50A is equipped with an inspection window 58 and an illumination member 59 on the upper part, with inspection doors 55, 55 and second vibrating members 56, 56 on the center part, with atmosphere release ports 57, 57 on the lower part, and with a stirring member 54 inside.

Furthermore, the tank 50A is configured by a double structure of an inner wall and an outer wall, and a warming member 50B is arranged between the inner wall and the outer wall of the tank 50A.

The inspection window 58 is a window arranged to make the inside of the tank 50A visible from the outside (FIG. 3), and is arranged on the upper part of the tank 50A. The inspection window 58 is integrally formed by attaching a colorless and transparent member to the opening of the tank 50A while keeping the airtightness. As the colorless and transparent member, a material such as glass or plastic which has high transparency and strength capable of withstanding a depressurization state may be used.

In addition, the illumination member 59 is an illumination unit such as an LED or a fluorescent lamp arranged to illuminate the wheat flour in the tank 50A to make the inside of the tank 50A visually recognizable from the inspection window 58, and is arranged on the upper part of the tank 50A.

The illumination member 59 may be attached to the inner surface of the upper part of the tank 50A, or may be attached in a manner of attaching a transparent member on the opening of the tank 50A and illuminating the inside of the tank 50A from the outside of the tank 50A through the transparent member.

The inspection doors 55, 55 are doors for cleaning the inside of the tank 50A, and are arranged on the center parts of the front surface and the back surface of the tank 50A. The inspection doors 55, 55 are supported to be rotatable via hinges or the like in the tank 50A (FIG. 2, FIG. 3). A grip portion 551 is arranged on the surface of the inspection doors 55, 55, and by opening and closing the inspection doors 55, 55 with the grip portion 551, an operator may clean the inside of the tank 50A.

The inspection doors 55, 55 may be a single-opening type or a double-opening type, and the two types can be selected as appropriate.

The second vibrating members 56, 56 are vibration members that vibrate at a predetermined frequency and amplitude, and are arranged on the center parts of the left and right side surfaces of the tank 50A (FIG. 2, FIG. 3, FIG. 4). As the second vibrating members 56, 56, a pneumatic or electro-magnetic knocker, a vibrator, a piezoelectric vibrator, an ultrasonic vibrator, or the like is used.

When the wheat flour is discharged from the holding bin 50, the second vibrating members 56, 56 vibrate to give vibration to the tank 50A, and thereby it becomes possible to reliably drop the wheat flour adhering to the inner wall of the tank 50A toward the discharge port.

The atmosphere release ports 57, 57 are opening parts used when the tank 50A is released to the atmosphere from the depressurization state, and are arranged along the outer wall of the lower part of the tank 50A. The atmosphere release port 57 is provided with a valve such as an electro-magnetic valve, and the atmosphere can be released from the depressurization state to an atmospheric pressure state by opening and closing the valve.

Since the atmosphere release ports 57, 57 are arranged on the lower part of the tank 50A, the wheat flour is pressed by the air which suddenly flows into the tank 50A and pushed upward in the tank 50A during the atmosphere release, and it becomes possible to prevent the wheat flour from being compacted.

The warming member 50B (not shown) is a member arranged to prevent the adhesion of the wheat flour to the inner wall of the tank 50A caused by dew condensation, and is arranged in a built-in state between the inner wall and the outer wall of the tank 50A which has a double structure.

It is possible to use an electric heater, warm water, or the like as the warming member 50B. For example, a conductive wire of an electric heater or a thin tube capable of allowing warm water to flow inside is built-in and attached to the entire tank 50A in a state of wound around the tank 50A. In addition, the warming member 50B is also arranged on the inspection doors 55, 55.

Since it is necessary to prevent the dew condensation on the inner wall while the wheat flour in the tank 50A is cooled, it is necessary for the warming member 50B to warm the inner wall part which is not in contact with the wheat flour in the tank 50A without warming the inner wall part which is in contact with the wheat flour in the tank 50A. Thereby, it becomes possible that the warming member 50B is divided into predetermined regions to perform on/off control of warming in each region.

In the embodiment, the tank 50A is divided into three regions, namely an upper part region, a center part region including the inspection doors 55, 55 and a lower part region, and the on/off control of warming can be performed individually. When a large amount of the wheat flour is stored in the tank 50A and reaches the center part region, only the upper part region is warmed. Conversely, when a small amount of the wheat flour is stored only in the lower part region, the upper part and the center part regions are warmed.

In this way, the temperature of the inner wall of the tank 50A is set to be higher than the temperature of the wheat flour by the warming member 50B. Thereby, it is possible to prevent the dew condensation on the inner wall of the tank 50A and prevent the wheat flour from adhering to the inner wall of the tank 50A.

Figure 5:
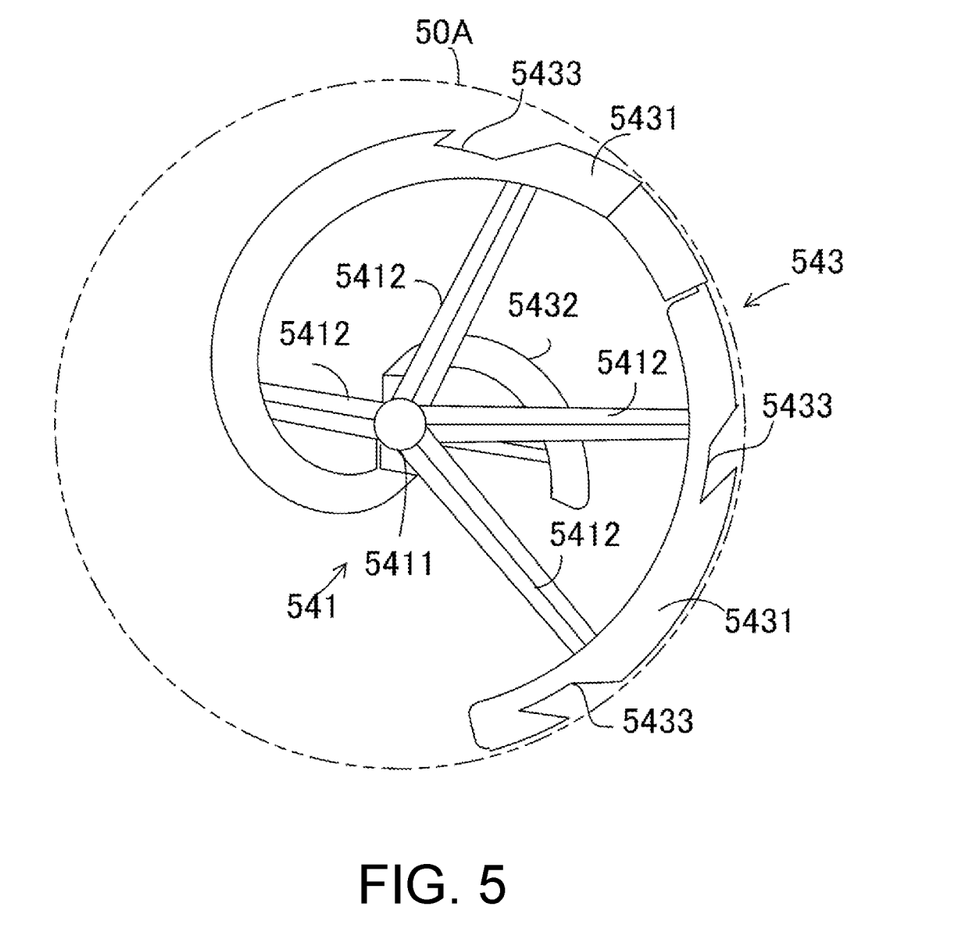
FIG. 5 is a schematic diagram showing an internal structure of the holding bin 50 of the embodiment.
Figure 6:
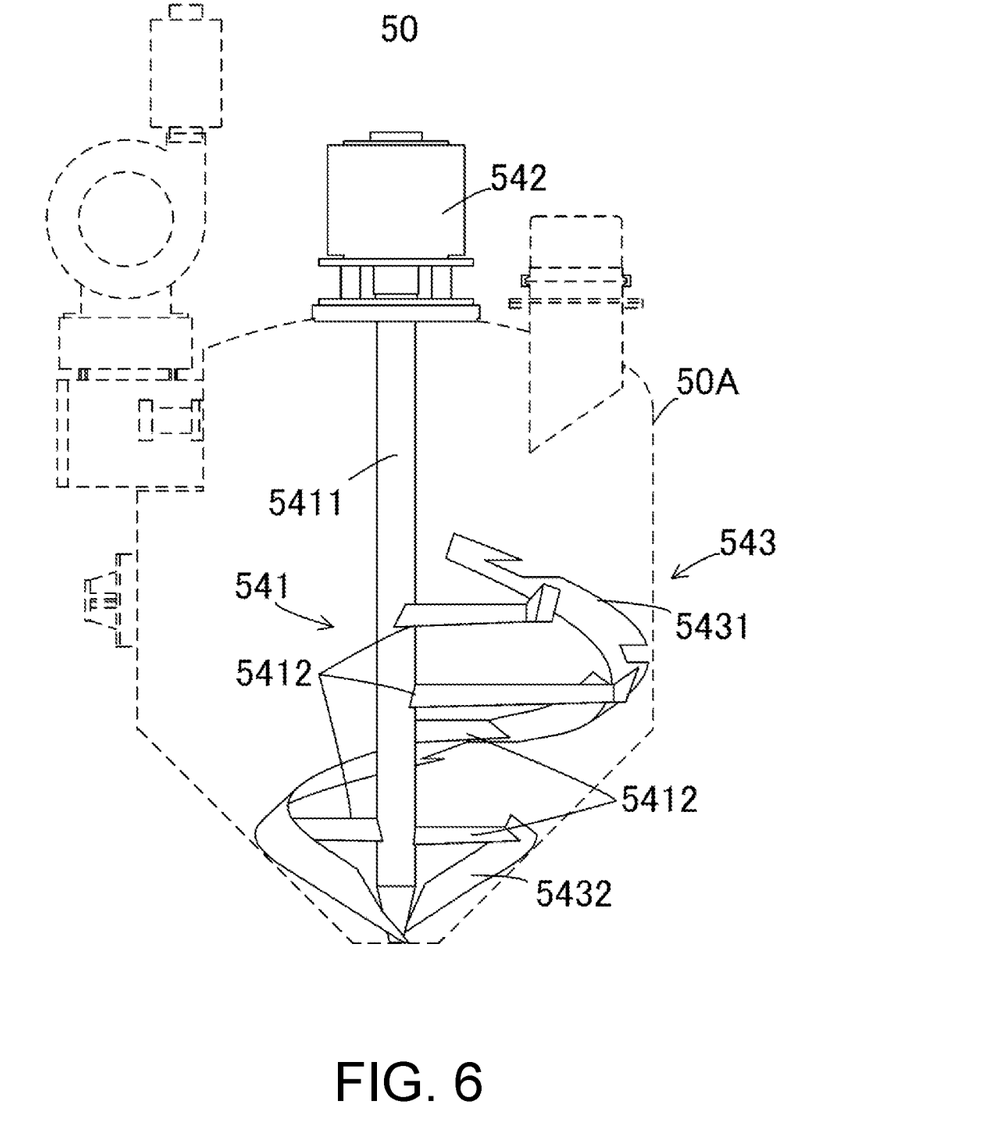
FIG. 6 is a plane schematic diagram showing a stirring member 54 of the embodiment.

FIG. 5 is a schematic diagram showing an internal structure of the holding bin 50 of the embodiment. FIG. 6 is a plane schematic diagram showing the stirring member 54 of the embodiment.

The stirring member 54 is a member for stirring the wheat flour in the tank 50A while the upper and lower layers are exchanged, and includes a stirring shaft 541, a stirring motor 542 and a stirring blade 543 (FIG. 5).

The stirring shaft 541 is a shaft for rotating the stirring blade 543, and includes a main shaft 5411 and a plurality of attaching shafts 5412, 5412 . . . .

The main shaft 5411 extends in an up-down direction inside the tank 50A. One end of the main shaft 5411 is connected to the stirring motor 542, and the stirring blade 543 is attached to the other end of the main shaft 5411 via the attaching shafts 5412, 5412 . . . . The main shaft 5411 rotates by the stirring motor 542 and thereby the stirring blade 543 rotates inside the tank 50A.

The attaching shaft 5412 is a rod-shaped member for attaching the stirring blade 543 to the stirring shaft 541, and extends in the radial direction centered on the main shaft

5411. In addition, the attaching shaft 5412 is arranged along the main shaft 5411 at an interval in the up-down direction, one end of the attaching shaft 5412 is attached to the main shaft 5411, and the other end of the attaching shaft 5412 is attached to the stirring blade 543.

The stirring motor 542 is arranged near the center of the upper part of the tank 50A, and drives the stirring shaft 541 to rotate.

The stirring blade 543 is a blade that rotates in the tank 50A to stir the wheat flour, and includes main blades 5431 and auxiliary blades 5432 (FIG. 5, FIG. 6).

When viewed from the front (FIG. 5), the main blade 5431 is formed into a shape in which a belt-shaped blade is spirally wound along the inner wall of the tank 50A at a constant interval from the peripheral surface of the main shaft 5411.

In addition, when viewed from the plane (FIG. 6), the main blade 5431 is formed into a swirl shape in a manner of approaching the main shaft 5411 as the belt-shaped blade gyrates, and the radius of curvature of the main blade 5431 gets smaller from the upper side to the lower side of the tank 50A.

In addition, a plurality of notches 5433, 5433 . . . are arranged on the outer periphery of the main blade 5431.

The auxiliary blade 5432 is a blade arranged below the main blade 5431, and is attached to the lower end of the main shaft 5411 via the attaching shaft 5412.

Similar to the main blade 5431, the auxiliary blade 5432 is formed into a shape in which the belt-shaped blade is spirally wound by half a rotation along the inner wall of the tank 50A at a constant interval from the peripheral surface of the main shaft 5411, and is formed into the swirl shape in a manner of approaching the main shaft 5411 as the belt-shaped blade gyrates. In addition, the main blade 5431 and the auxiliary blade 5432 are arranged at point-symmetric positions centered on the main shaft 5411.

Similarly to the main blade 5431, the auxiliary blade 5432 may also be equipped with the notch 5433.

Since the main blade 5431 and the auxiliary blade 5432 are formed into a spiral and swirl shape along the inner wall of the tank 50A in this way, the wheat flour can be largely mixed from the bottom in a manner that the upper and lower layers are exchanged when the stirring blade 543 rotates, a gap is formed between the wheat flour, and the compaction of the lower layer can be prevented.

The holding bin 50 is equipped with a valve 51 which is a first vacuum shutoff valve, a valve 52 which is a second vacuum shutoff valve, and a valve 53 which is a third vacuum shutoff valve, and the valves can perform opening/closing operation synchronously by the control device 3 shown in FIG. 1.

The valve 51 opens and closes an exhaust port that discharges gas in the tank 50A of the holding bin 50. The valve 52 opens and closes an introduction port that introduces the wheat flour, which is food wheat flour, into the tank 50A. The valve 53 opens and closes a supply port that supplies the wheat flour in the tank 50A to the chamber 2A of the mixer 2 which is the processing container.

By closing all the valves 51, 52, and 53 to seal the tank 50A of the holding bin 50, the inside of the tank 50A can be maintained in the depressurization state.

Each of the valves 51, 52, 53 has pressure resistance with respect to a low atmospheric pressure in the depressurization state. Specifically, the valves 51, 52, and 53 arranged in the holding bin 50 in the wheat flour supply system 1 of the embodiment are electric butterfly valves.

The vacuum device 70 includes vacuum pumps 71A and 71B, filters 72A and 72B that are filters, a cold trap 73 that is a moisture removing device, valves 75A and 75B that are three-way switching valves, a drain tank 77, and a first vibrating member 78 that is attached to the filter 72A.

The vacuum pumps 71A and 71B are pumps for reducing the pressure inside the tank 50A.

Since when the pressure inside the tank 50A is reduced, a considerable amount of time is required for one type of vacuum pump to make the tank 50A reach a desired depressurization state, two types of vacuum pumps which are a water-sealed vacuum pump and an oil rotary vacuum pump are switched and used in the embodiment.

Since the vacuum pump 71A is an oil rotary vacuum pump and is a vacuum pump that is particularly effective in a high vacuum state, the vacuum pump 71A is driven when the pressure is further reduced after the pressure has been reduced by the vacuum pump 71B. Since the vacuum pump 71B is a water-sealed vacuum pump and is a vacuum pump that is particularly effective in the low vacuum region, the vacuum pump 71B is operated first to reduce the pressure inside the tank 50A.

The upstream side of the vacuum pump 71A is connected to the downstream side of the cold trap 73 via the valve 75A.

The upstream side of the vacuum pump 71B is connected to the downstream side of the cold trap 73 via the valves 75A and 75B. In addition, the vacuum pump 71B may also be used to serve as a pump for evacuating the mixer 2.

The filter 72A is a filter for removing fine particles contained in the gas which include the wheat flour, and is arranged in a housing which is disposed on the lower part of the holding bin 50.

The upstream side of the filter 72A is connected to a gas discharge port of the holding bin 50 via the valve 51, and the downstream side of the filter 72A is connected to the upstream side of the cold trap.

The filter 72B is a filter when the vacuum pump 71B is used as a pump for evacuating the mixer 2, and is a filter used for removing the wheat flour contained in the gas which is sucked by the vacuum pump 71B and suppressing the pollution of the environment inside a factory caused by the exhaust of the vacuum pump 71B.

The upstream side of the filter 72B is connected to the chamber 2A of the mixer 2, and the downstream side of the filter 72B is connected to the vacuum pump 71B via the valve 75B.

The cold trap 73 is a device capable of removing the moisture contained in the gas, and may use a known configuration such as a heat exchanger configured so that a refrigerant is circulated in a pipe to condense the moisture of the gas.

The upstream side of the cold trap 73 is connected to the gas discharge port of the filter 72A. From the gas discharged from the holding bin 50, the fine particle such as the wheat flour is removed by the filter 72A, and then the moisture is removed by the cold trap 73.

In addition, the temperature of the refrigerant circulated in the pipe is set to be lower than the temperature of the wheat flour. This is since the steam evaporated from the wheat flour in the tank 50A can be collected more quickly by lowering the temperature of the refrigerant, the amount of the steam in the holding bin 50 rapidly decreases and thereby the rising speed of the vacuum degree inside the tank 50A becomes faster, and it is possible to lower the temperature of the wheat flour quickly.

In addition, the cold trap 73 is desirably arranged near the gas discharge port of the filter 72A. This is since it is possible for the cold trap 73 near the gas discharge port of the filter 72A to quickly capture the steam generated in the holding bin 50, and as a result, as described above, it is possible to lower the temperature of the wheat flour quickly.

The drain tank 77 is a tank that temporarily stores drainage collected by the cold trap 73, and is arranged on the lower part of the cold trap 73 (FIG. 1, FIG. 4). It is possible to collectively drain the drainage temporarily stored in the drain tank 77 via a pipe which is not shown.

The first vibrating member 78 is a vibration member that vibrates at a predetermined frequency and amplitude, and is arranged at a center position of the filter 72A (FIG. 4). As the first vibrating member 78, a pneumatic or electromagnetic knocker, a vibrator, a piezoelectric vibrator, an ultrasonic vibrator, or the like is used.

When the wheat flour is discharged from the holding bin 50, the first vibrating member 78 vibrates to give vibration to the filter 72A, and thereby the wheat flour deposited on the filter 72A falls and is removed. By using the first vibrating member 78, it is possible to solve the problem that the pressure inside the tank 50A cannot be appropriately reduced because of the clogging of the filter 72A and the capacity of the vacuum pump is not sufficiently exerted.

The control device 3 is a control device that controls the entire wheat flour supply system 1.

Specifically, the control device 3 performs valve switching control of the valve 51, 52, and 53 or the like, drive control of the vacuum pumps 71A and 71B, cooling control of the cold trap 73, drive control of the stirring member 54, drive control of the first vibrating member 7 and the second vibrating members 56, 56, warming on/off control of the warming member 50B, and the like.
In addition, the control device 3 has a setting screen for setting an internal pressure reference value and an internal pressure upper limit value of the tank 50A of the holding bin 50. The internal pressure reference value of the tank 50A is set to be equal to or lower than the atmospheric pressure at which the latent heat of evaporation is generated. This is because by setting the internal pressure reference value to be equal to or lower than the atmospheric pressure at which the latent heat of evaporation is generated, a part of the moisture retained by the wheat flour can be forcibly evaporated in the tank 50A, and the wheat flour can be cooled utilizing the latent heat at that time.

The internal pressure upper limit value of the tank 50A is an upper limit value of the internal pressure of the tank 50A, and when the internal pressure exceeds the value, the vacuum pump 71A is driven.

The internal pressure reference value and the internal pressure upper limit value of the tank 50A may be set manually by the setting screen or may be set automatically.

Figure 7:
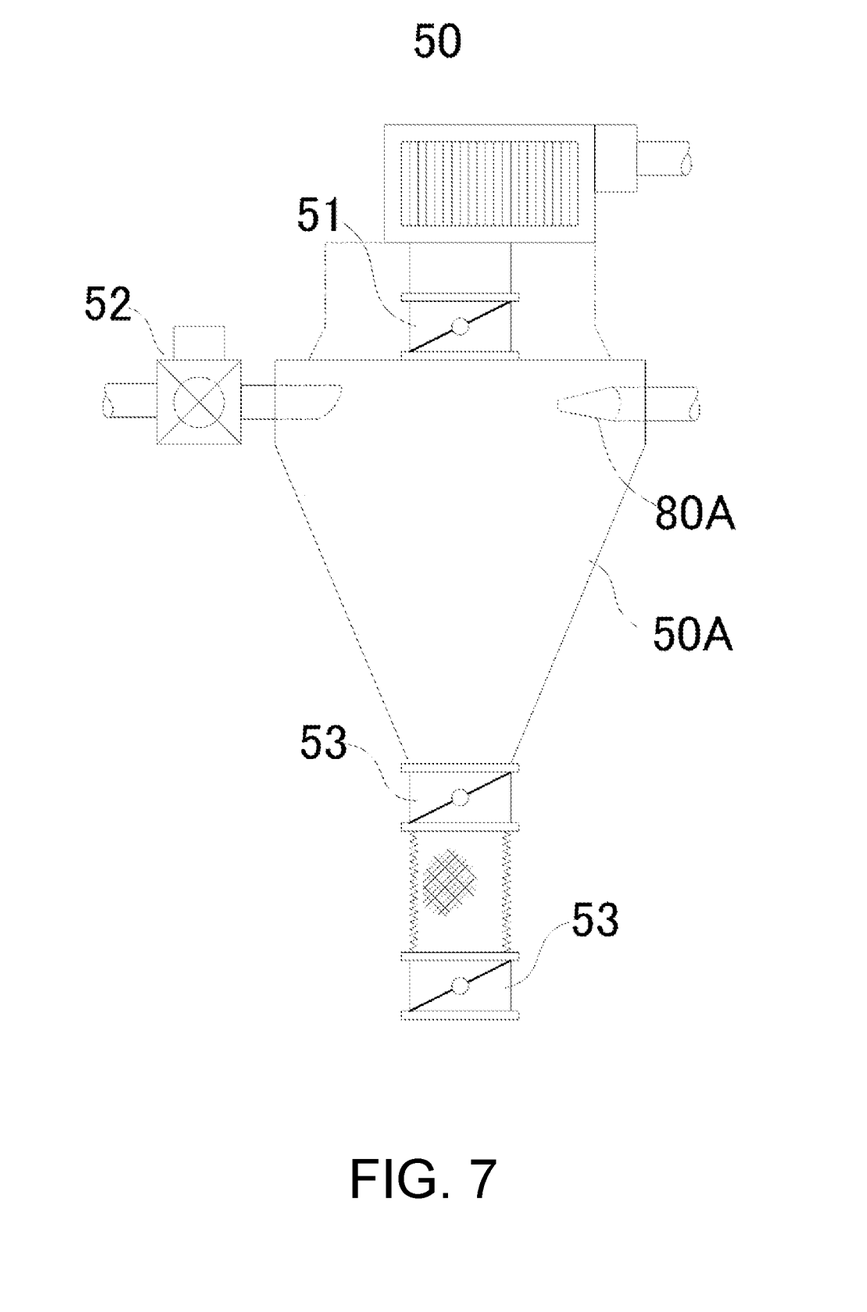
FIG. 7 is a front schematic diagram showing a humidifying device 80 of the embodiment.

FIG. 7 is a front schematic diagram showing a humidifying device 80 of the embodiment.

In the wheat flour supply system 1, the humidifying device 80 may be arranged in the holding bin 50 which is the supply tank.

The humidifying device is a device attached to the tank 50A of the holding bin 50 for humidifying the inside of the tank 50A, and has a nozzle 80A which is an injection device that sprays or injects and supplies mist and steam, a tank (not shown) which is a water storage tank, and a heating-cooling device (not shown) for heating or cooling water in a range of 5° C. or higher and lower than 100° C.

The latent heat of evaporation of the water varies depending on the water temperature at that time, and the moisture content required to lower the water temperature to a target water temperature also differs. Therefore, it becomes possible to shorten the cooling time by replenishing the moisture into the tank 50A from the nozzle 80A by the humidifying device 80 when the moisture content is not sufficient during the cooling period of the wheat flour.

(Flow of Material Powder Cooling Control)

Figure 8:
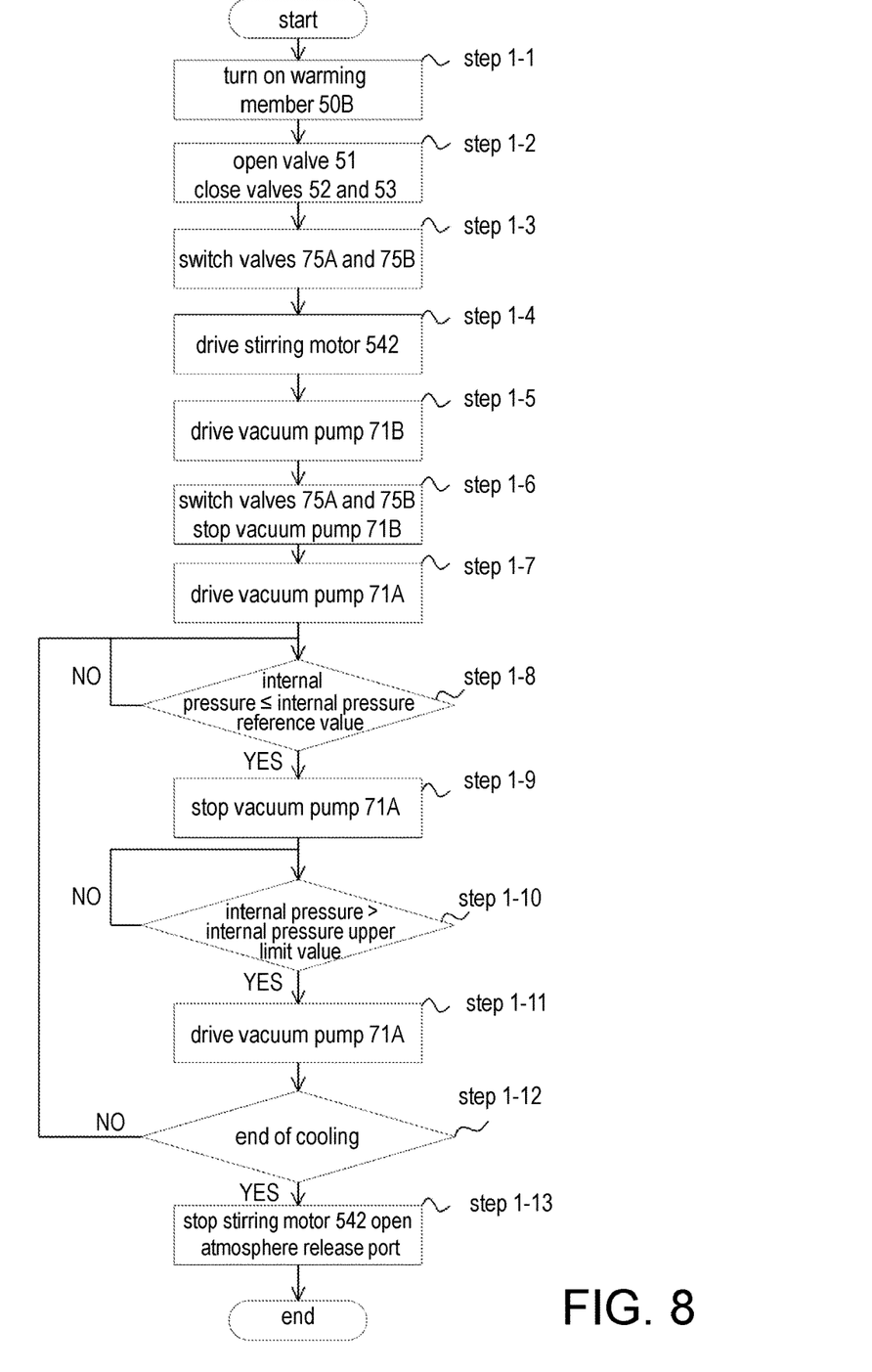
FIG. 8 is a flow chart showing the flow of a material powder cooling control of the embodiment.

FIG. 8 is a flow chart showing the flow of a material powder cooling control of the embodiment.

A cooling control method for the material powder using the wheat flour supply system 1 according to the embodiment is described. The cooling control method is executed at a predetermined timing, for example, a timing at which the cooling of the wheat flour is started.

When the cooling of the wheat flour is started, first, the control device 3 drives the warming member 50B to warm the inner wall of the tank 50A (step 1-1).

Next, the control device 3 opens the valve 51 and closes the valve 52 and the valve 53 (step 1-2), and then operates the valves 75A and 75B to open an exhaust line to the vacuum pump 71B (step 1-3).

Furthermore, the control device 3 drives the stirring motor 542 to cause the stirring shaft 541 to rotate, and to cause the stirring blade 543 to rotate in the tank 50A (step 1-4). When the stirring blade 543 rotates in the tank 50A, the upper and lower layers of the wheat flour are exchanged with each other and a gap is formed between the wheat flour, and it becomes possible to accelerate the evaporation of the moisture of the wheat flour in the lower layer.

Next, the control device 3 activates the vacuum pump 71B (step 1-5). When the vacuum pump 71B is activated, the steam in the tank 50A passes through the filter 72A to remove the fine particles which include unnecessary wheat flour, and passes through the cold trap 73 to remove the moisture. The internal pressure of the tank 50A gradually decreases.

Then, the control device 3 checks the inside of the holding bin 50 with the pressure sensor 76, and when the internal pressure of the tank 50A is reduced to a predetermined internal pressure value, the control device 3 operates the valves 75A and 75B to open an exhaust line to the vacuum pump 71A and stop the vacuum pump 71B this time (step 1-6).

Thereafter, the control device 3 activates the vacuum pump 71A (step 1-7). When the vacuum pump 71A is activated, the pressure inside the tank 50A is further reduced, and as in the case of the vacuum pump 71B, the steam in the tank 50A passes through the filter 72A to remove the fine particles which include unnecessary wheat flour, and passes through the cold trap 73 to remove the moisture.

The control device 3 checks the pressure inside the holding bin 50 with the pressure sensor 76, and when the internal pressure of the tank 50A is reduced to be equal to or lower than the internal pressure reference value (step 1-8), the control device 3 stops the vacuum pump 71A to maintain the depressurization state inside the tank 50A (step 1-9). Even after the vacuum pump 71A is stopped, the exhaust line to the vacuum pump 71A is opened. Therefore, the moisture is removed by the cold trap 73 from the gas discharged from the tank 50A, and the internal pressure of the holding bin 50 is further reduced even after the vacuum pump 71A is stopped.

When the pressure inside the holding bin 50 reaches a pressure at which the moisture evaporation of the material occurs, the temperature of the wheat flour begins to drop. The pressure inside the holding bin 50 is maintained and the wheat flour is cooled until the temperature of the wheat flour reaches a desired temperature.

The control device 3 constantly monitors the pressure inside the holding bin 50, and when the internal pressure of the holding bin 50 becomes equal to or higher than the internal pressure upper limit value (step 1-10), the control device 3 operates the vacuum pump 71A again (step 1-11).

When the cooling of the wheat flour is completed (step 1-12), the control device 3 stops the stirring motor 542, and opens the atmosphere release ports 57, 57 to make the internal pressure of the tank 50A return to a normal pressure (step 1-13).

When the atmosphere release ports 57, 57 are opened, air flows into the tank 50A from the lower part of the tank 50A, and the wheat flour is pressed by the air and pushed upward in the tank 50A.

(Flow of Material Powder Discharge Control)

Figure 9:
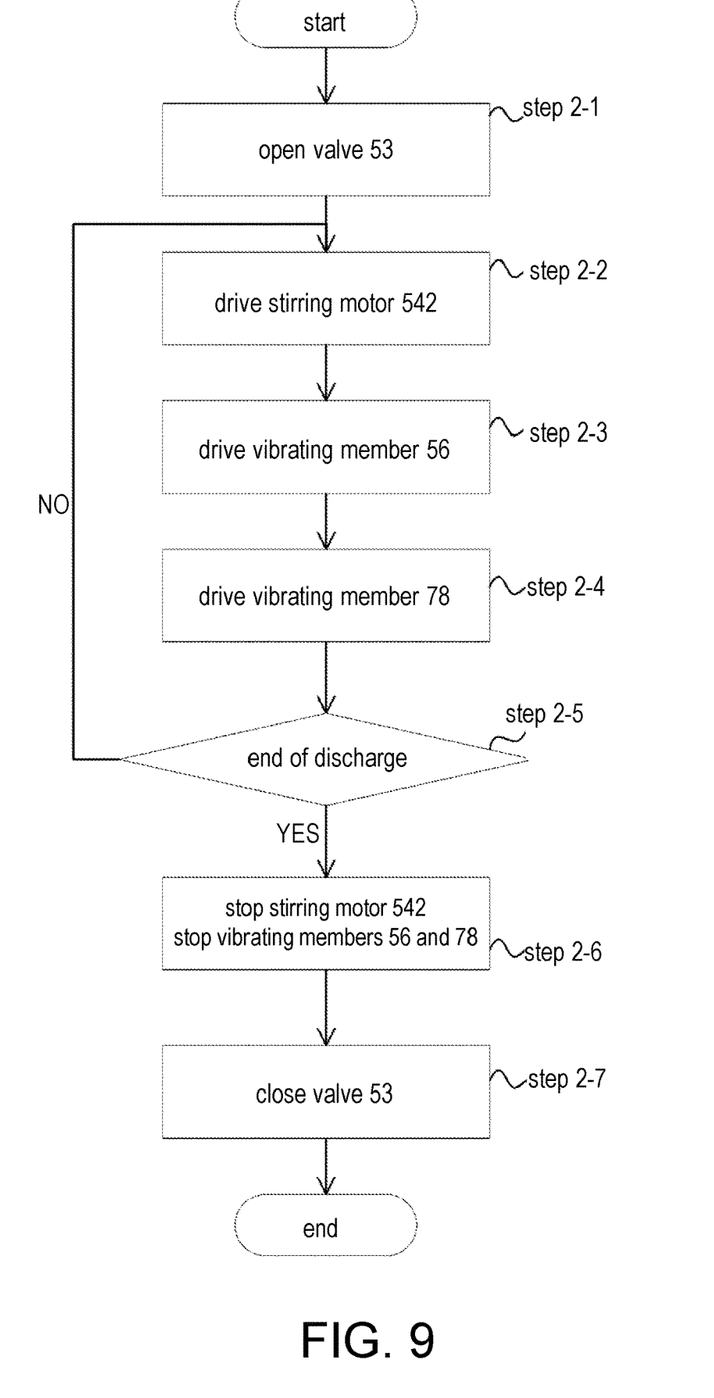
FIG. 9 is a flow chart showing the flow of a material powder discharge control of the embodiment.

FIG. 9 is a flow chart showing the flow of a material powder discharge control of the above embodiment.

A discharge control method for the material powder using the wheat flour supply system 1 according to the embodiment is described. The discharge control method is executed at a predetermined timing, for example, a timing of performing the discharge of the wheat flour.

When the discharge of the wheat flour is performed, first, the control device 3 opens the valve 53 (step 2-1).

Next, the control device 3 drives the stirring motor 542 to cause the stirring shaft 541 to rotate, and to cause the stirring blade 543 to rotate in the tank 50A (step 2-2). When the stirring blade 543 rotates in the tank 50A, the discharge of the wheat flour can be prompted.

Then, the control device 3 drives the second vibrating members 56, 56 (step 2-3). When the second vibrating members 56, 56 vibrate, the vibration is transmitted to the tank 50A, and the wheat flour adhering to the inner wall of the tank 50A falls downward.

Furthermore, the control device 3 drives the first vibrating member 78 (step 2-4). The first vibrating member 78 vibrates, and thereby the wheat flour deposited on the filter 72A falls.

When the discharge of the wheat flour is completed (step 2-5), the control device 3 stops the second vibrating members 56, 56, the first vibrating member 78, and the stirring motor 542 (step 2-6).

Thereafter, the control device 3 closes the valve 53 (step 2-7).

In the embodiment of the disclosure, the wheat flour is described as the food material powder, but the food material powder may be a food material powder of particulate shape such as cornstarch, rice flour, buckwheat flour or a food material powder of granular shape such as rice grain, soybean.

In addition, in the embodiment of the disclosure, the vacuum device 70 or the stirring member 54 are arranged in the holding bin 50, but the same mechanisms can be also arranged in the scale 30 or the mixer 2.

The disclosure is not limited to the embodiments described above, and some specific examples have already been shown. However, it is possible to modify the embodiment, to replace members, and to combine with a known device without departing from the technical idea of the disclosure. In addition, in the wheat flour supply system of the embodiment, the operation of a temperature adjusting device which includes the vacuum pump and the vacuum valve performed by the control device is merely an example, and modifications on the design can be made within a range in which the effect of the disclosure can be obtained; for example, the temperature of the food material powder can be quickly brought to a predetermined temperature in the manner of changing the order of operation in accordance with the type of the food material powder and the food processing machine.

INDUSTRIAL APPLICABILITY

The disclosure can be applied to a food material powder supply device which includes a supply tank for supplying food material powder to a processing container of a food processing machine. The disclosure improves the work efficiency of the food processing machine that processes the food material powder such as a mixer for a noodle making machine, a confectionery making machine, and a bread making machine, and contributes to the development of the food processing machine.

What is claimed is:

1. A food material powder supply device, comprising:
a supply tank that temporarily stores food material powder in a tank and supplies the food material powder to a processing container of a food processing machine;
a vacuum device that reduces the pressure inside the supply tank with vacuum pumps; and
a control device that operates the vacuum device to reduce the internal pressure of the supply tank to be equal to or lower than an atmospheric pressure at which moisture of the food material powder is evaporated, and cools the food material powder in the supply tank, wherein
a stirring member which is driven to rotate during the cooling of the food material powder is arranged inside the tank, and
the vacuum device comprises a filter connected to a gas discharge port of the supply tank, a cold trap arranged close to the gas discharge port of the filter, and a filter vibrating member attached to the filter.

2. The food material powder supply device according to claim 1, wherein the stirring member has a stirring blade, and the stirring blade is formed into a shape of being spirally wound along the inner wall of the tank.

3. The food material powder supply device according to claim 2, wherein the stirring blade comprises a main blade and an auxiliary blade.

4. The food material powder supply device according to claim 1, wherein the cold trap is cooled to a temperature lower than the temperature of the food material powder.

5. The food material powder supply device according to claim 1, wherein the vacuum device comprises a drain tank that temporarily stores drainage collected by the cold trap.

6. The food material powder supply device according to claim 1, wherein an atmosphere release port is arranged on the lower part of the tank.

7. The food material powder supply device according to claim 1, wherein a warming member is arranged in the tank.

8. The food material powder supply device according to claim 1, wherein an inspection window and an illumination member are arranged on the upper part of the tank.

9. The food material powder supply device according to claim 1, wherein an inspection door is arranged on the center part of the tank.

10. The food material powder supply device according to claim 1, wherein a tank vibrating member is arranged on the center part of the tank.

11. The food material powder supply device according to claim 1, wherein the control device performs control so as to measure the pressure inside the supply tank, and stop the vacuum pump when the pressure becomes equal to or lower than a reference value to maintain the depressurization state in the supply tank.

12. A food material powder supply device, comprising:
a supply tank that temporarily stores food material powder in a tank and supplies the food material powder to a processing container of a food processing machine;
a vacuum device that reduces the pressure inside the supply tank with vacuum pumps; and
a control device that operates the vacuum device to reduce the internal pressure of the supply tank to be equal to or lower than an atmospheric pressure at which moisture of the food material powder is evaporated, and cools the food material powder in the supply tank, wherein
a stirring member which is driven to rotate during the cooling of the food material powder is arranged inside the tank, and
an inspection window and an illumination member are arranged on the upper part of the tank.

13. A food material powder supply device, comprising:
a supply tank that temporarily stores food material powder in a tank and supplies the food material powder to a processing container of a food processing machine;
a vacuum device that reduces the pressure inside the supply tank with vacuum pumps; and
a control device that operates the vacuum device to reduce the internal pressure of the supply tank to be equal to or lower than an atmospheric pressure at which moisture of the food material powder is evaporated, and cools the food material powder in the supply tank, wherein
a stirring member which is driven to rotate during the cooling of the food material powder is arranged inside the tank, and
a tank vibrating member is arranged on the center part of the tank.

* * * * *